(12) United States Patent
Yamaguchi et al.

(10) Patent No.: US 11,148,561 B2
(45) Date of Patent: Oct. 19, 2021

(54) VEHICLE SEAT INCLUDING LOAD ABSORBERS, AND LOAD ABSORBING MEMBER

(71) Applicant: TOYOTA BOSHOKU KABUSHIKI KAISHA, Aichi (JP)

(72) Inventors: Takao Yamaguchi, Aichi (JP); Yasumasa Suzuki, Aichi (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 0 days.

(21) Appl. No.: 16/804,792

(22) Filed: Feb. 28, 2020

(65) Prior Publication Data

US 2020/0276921 A1 Sep. 3, 2020

(30) Foreign Application Priority Data

Mar. 1, 2019 (JP) .............................. JP2019-037935

(51) Int. Cl.
*B60N 2/42* (2006.01)
*B60N 2/68* (2006.01)

(52) U.S. Cl.
CPC ........... *B60N 2/4228* (2013.01); *B60N 2/682* (2013.01)

(58) Field of Classification Search
CPC .. B60N 2/4228; B60N 2/4221; B60N 2/4249; B60N 2/42709
See application file for complete search history.

(56) References Cited

U.S. PATENT DOCUMENTS

| | | | | |
|---|---|---|---|---|
| 8,845,019 B2 * | 9/2014 | Sawada | ............. | B60N 2/42745 |
| | | | | 297/216.1 |
| 2011/0057492 A1 * | 3/2011 | Nakamura | ............... | B60N 2/66 |
| | | | | 297/301.4 |
| 2012/0242124 A1 * | 9/2012 | Tanabe | .................... | B60N 2/433 |
| | | | | 297/216.14 |
| 2015/0165939 A1 * | 6/2015 | Seki | ...................... | B60N 2/4228 |
| | | | | 280/730.2 |
| 2015/0367762 A1 * | 12/2015 | Yasuda | ................... | B60N 2/686 |
| | | | | 297/216.14 |
| 2016/0009207 A1 * | 1/2016 | Kuroda | .............. | B60N 2/42727 |
| | | | | 297/180.14 |
| 2016/0009210 A1 * | 1/2016 | Sasaki | .................. | B60N 2/4228 |
| | | | | 297/180.13 |
| 2016/0207428 A1 * | 7/2016 | Kim | .................... | B60N 2/42745 |
| 2020/0282877 A1 * | 9/2020 | Gajda | ................ | B60N 2/42718 |

FOREIGN PATENT DOCUMENTS

| | | | | |
|---|---|---|---|---|
| EP | 1547857 A2 * | 6/2005 | ......... | B60N 2/42745 |
| JP | 2016-150732 | 8/2016 | | |
| WO | WO-2004086909 A1 * | 10/2004 | ........... | B60N 2/4228 |
| WO | WO-2007048256 A1 * | 5/2007 | ......... | B60N 2/42709 |
| WO | WO-2011083566 A1 * | 7/2011 | ............. | B60N 2/427 |
| WO | WO-2012077764 A1 * | 6/2012 | ........... | B60N 2/4228 |

(Continued)

*Primary Examiner* — Timothy J Brindley
(74) *Attorney, Agent, or Firm* — Greenblum & Bernstein, P.L.C.

(57) ABSTRACT

Provided is a vehicle seat mounted in a vehicle. The vehicle seat of the present disclosure includes a seat body, a seat frame forming a framework of the seat body, a first load absorber provided to a back of the seat frame, and a second load absorber provided lower than the first load absorber on the back of the seat frame.

15 Claims, 6 Drawing Sheets

(56) References Cited

FOREIGN PATENT DOCUMENTS

| WO | WO-2012161309 A1 | * | 11/2012 | ............... B60N 2/42 |
| WO | WO-2014115787 A1 | * | 7/2014 | ............. B60N 2/427 |
| WO | WO-2015174382 A1 | * | 11/2015 | ............... B60N 2/42 |
| WO | WO-2016167180 A1 | * | 10/2016 | ............... B60N 2/90 |
| WO | WO-2017056337 A1 | * | 4/2017 | ............... B60N 2/68 |
| WO | WO-2017086211 A1 | * | 5/2017 | ............... B60N 2/20 |
| WO | WO-2017137102 A1 | * | 8/2017 | ........... B60N 2/1635 |

\* cited by examiner

VEHICLE SEAT INCLUDING LOAD ABSORBERS, AND LOAD ABSORBING MEMBER

CROSS-REFERENCE TO RELATED APPLICATIONS

This application claims the benefit of Japanese Patent Application No. 2019-37935 filed on Mar. 1, 2019 with the Japan Patent Office, the entire disclosure of which is incorporated herein by reference.

BACKGROUND

The present disclosure relates to a vehicle seat mounted in a vehicle.

For example, a vehicle rear seat disclosed in Japanese Unexamined

Patent Application Publication No. 2016-150732 (Patent Document 1) is provided with an impact absorbing member on a back surface of its seatback. The impact absorbing member is a member for absorbing impact applied when a cargo carried in the luggage space collides with the seatback.

SUMMARY

Various tests performed by the inventors and/or other person have revealed that there is a collision mode in which the configuration disclosed in Patent Document 1 cannot absorb an impact load sufficiently. In one aspect of the present disclosure, it is desirable to improve impact absorption performance in a vehicle seat.

It is desirable that a vehicle seat mounted in a vehicle comprise, for example, at least one of the following elements. Specifically, the elements are a seat body, a seat frame forming a framework of the seat body, a first load absorber provided to a back of the seat frame, and a second load absorber provided lower than the first load absorber on the back of the seat frame.

In the configuration of the prior art, the collision mode found as a collision mode where the impact load cannot be absorbed sufficiently is, for example, "a collision mode in which an upper end of the cargo collides against the impact absorbing member and then the cargo rotates, thus causing a portion of the cargo lower than the upper end to collide against the back surface of the vehicle seat".

The vehicle seat of the present disclosure makes it possible, for example, even when the upper end of a cargo collides against the first load absorber and then the cargo rotates, to absorb an impact load at the second load absorber. Thus, even in the event of the above-described collision mode, the impact can be absorbed sufficiently. In other words, impact absorption performance can be improved.

The vehicle seat of the present disclosure may be configured as follows. Specifically, the seat body may comprise a seatback and a seat cushion; the seat frame may comprise a back frame forming a framework of the seatback, and a cushion frame forming a framework of the seat cushion; the first load absorber is provided to the back frame, and the second load absorber may be provided to the cushion frame. This may make it possible to absorb the impact even when the load is input to the vehicle seat in the above-described collision mode.

It is desirable that the cushion frame comprise a first side frame and a second side frame each extending in a seat front-rear direction, and a coupler coupling a rear end of the first side frame and a rear end of the second side frame to each other, the coupler extending in a seat width direction, and that the second load absorber be configured to transmit at least part of a load input to the second load absorber to the coupler.

Thus, part of the load input to the second load absorber is transmitted dispersedly to the first side frame and to the second side frame via the coupler. This inhibits the load from concentrating in a part of the cushion frame, thus inhibiting severe damage to the cushion frame.

It is desirable that the second load absorber comprise a load receiver formed on a plane intersecting the seat front-rear direction, and a load transmitter connected to a back of the coupler and extending rearward from the coupler, the load transmitter being provided with, at an extending-direction end thereof, the load receiver. This makes it possible to reliably transmit at least part of the load input to the second load absorber to the coupler.

BRIEF DESCRIPTION OF THE DRAWINGS

Example embodiments of the present disclosure will be described below with reference to the accompanying drawings, in which.

DETAILED DESCRIPTION OF EXEMPLARY EMBODIMENTS

Figure 1:
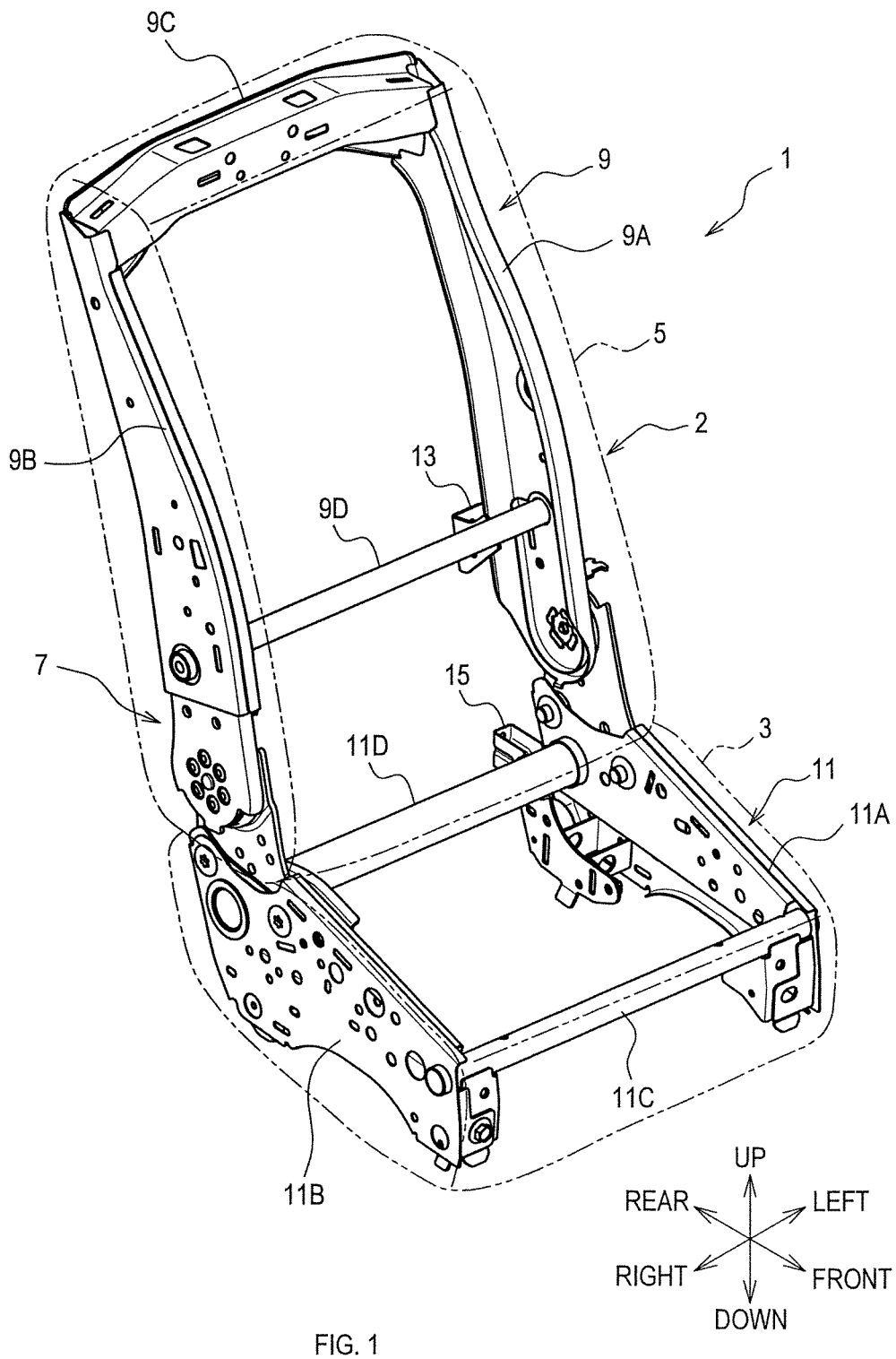
FIG. 1 is a diagram showing a vehicle seat according to a first embodiment.

"Embodiments" described below show examples of embodiments belonging to the technical scope of the present disclosure. In other words, matters specifying the invention and so on recited in the appended claims are not limited by specific configurations, structures, and the like, indicated in the below-described embodiments.

In the embodiments, explanations will be given of an example of a seat (hereinafter referred to as a vehicle seat) mounted in a vehicle, such as an automobile. Arrows indicating directions shown in the drawings are provided for the purpose of easier understanding of mutual relationships between the drawings, shapes of members and/or portions, and so on.

Thus, the vehicle seat is not limited by the directions shown in the drawings. The directions shown in the drawings are based on a state in which the vehicle seat according to the embodiments is mounted in the vehicle.

At least a member or portion described with a reference numeral affixed thereto is at least one in number except in a case of being accompanied by a specifying term, such as "only one". In other words, the member or portion may be two or more in number unless accompanied by the specifying term, such as "only one".

First Embodiment

1. Overview of Vehicle Seat

As shown in FIG. 1, a seat body 2 of a vehicle seat 1 comprises at least a seat cushion 3 and a seatback 5. The seat cushion 3 supports an occupant's buttocks. The seatback 5 supports the occupant's back.

<Frame Structure>

A seat frame 7 forms a framework of the seat body 2. The seat frame 7 comprises a back frame 9 and a cushion frame 11. The back frame 9 forms a framework of the seatback 5.

The back frame 9 comprises at least a first back side-frame 9A, a second back side-frame 9B, a first back coupler 9C (also known as an upper back coupler), and a second back coupler 9D (also known as a lower back coupler).

The first back side-frame 9A and the second back side-frame 9B extend substantially vertically. The second back side-frame 9B is arranged in a position displaced relative to the first back side-frame 9A in a seat width direction.

The first back coupler 9C and the second back coupler 9D extend in the seat width direction and couple the first back side-frame 9A and the second back side-frame 9B to each other. The first back coupler 9C is arranged at an upper end of the back frame 9.

The second back coupler 9D is arranged below the first back coupler 9C. The first back coupler 9C is a panel-like member obtained by pressing a plate material into a specified shape. The second back coupler 9D is a steel pipe shaped like a round pipe.

The cushion frame 11 forms a framework of the seat cushion 3. The cushion frame 11 comprises at least a first cushion side-frame 11A, a second cushion side-frame 11B, a first cushion coupler 11C (also known as a front cushion coupler), and a second cushion coupler 11D (also known as a rear cushion coupler).

The first cushion side-frame 11A and the second cushion side-frame 11B extend in a seat front-rear direction. The second cushion side-frame 11B is arranged in a position displaced relative to the first cushion side-frame 11A in the seat width direction.

The first cushion coupler 11C and the second cushion coupler 11D extend in the seat width direction and couple the first cushion side-frame 11A and the second cushion side-frame 11B to each other. The first cushion coupler 11C and the second cushion coupler 11D are each a steel pipe shaped like a round pipe.

The first cushion coupler 11C couples a front end of the first cushion side-frame 11A and a front end of the second cushion side-frame 11B to each other. The second cushion coupler 11D couples a rear end of the first cushion side-frame 11A to a rear end of the second cushion side-frame 11B.

2. Load Absorbing Structure

2.1 Overview of Load Absorbing Structure

Figure 2:
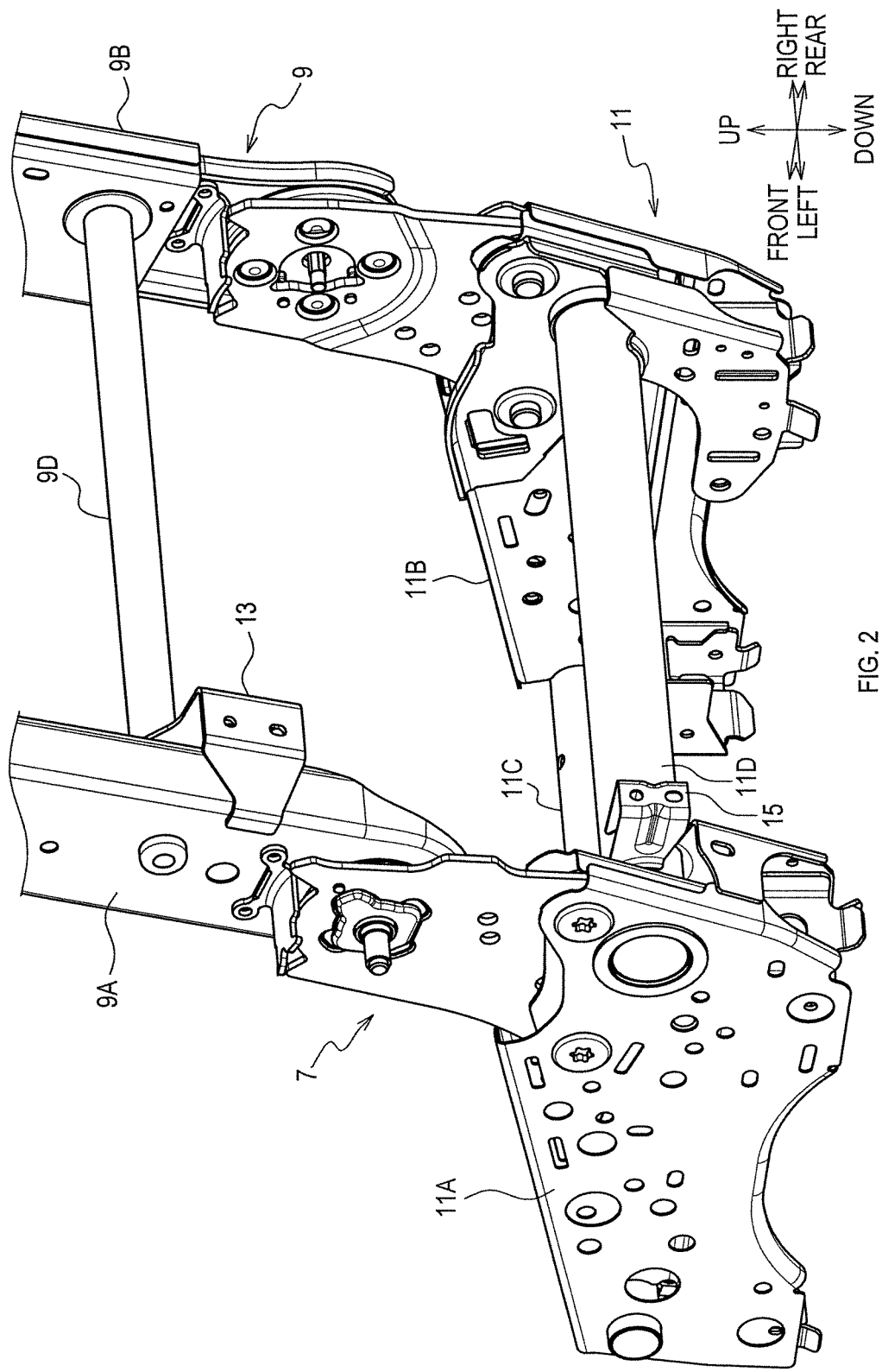
FIG. 2 is a diagram showing the vehicle seat according to the first embodiment.

As shown in FIG. 2, a first load absorber 13 and a second load absorber 15 are provided on the back of the seat frame 7. The first load absorber 13, which is a metal member, is plastically deformed upon application thereto of a load (hereinafter referred to as a first load) directed toward a seat front side and greater than a specified magnitude.

The second load absorber 15 is provided lower than the first load absorber 13 on the back of the seat frame 7. The second load absorber 15, which is a metal member, is plastically deformed upon application thereto of a load (hereinafter referred to as a second load, which is different from the first load) directed toward the seat front side and greater than a specified magnitude.

As for conceivable magnitude relationships between the first load and the second load, the first load and the second load may be equal to each other, or the first load may be greater than the second load, or the second load may be greater than the first load. The present embodiment is based on the assumption that the first load is greater than the second load.

2.2 Details of Load Absorbing Structure

<First Load Absorber>

Figure 3:
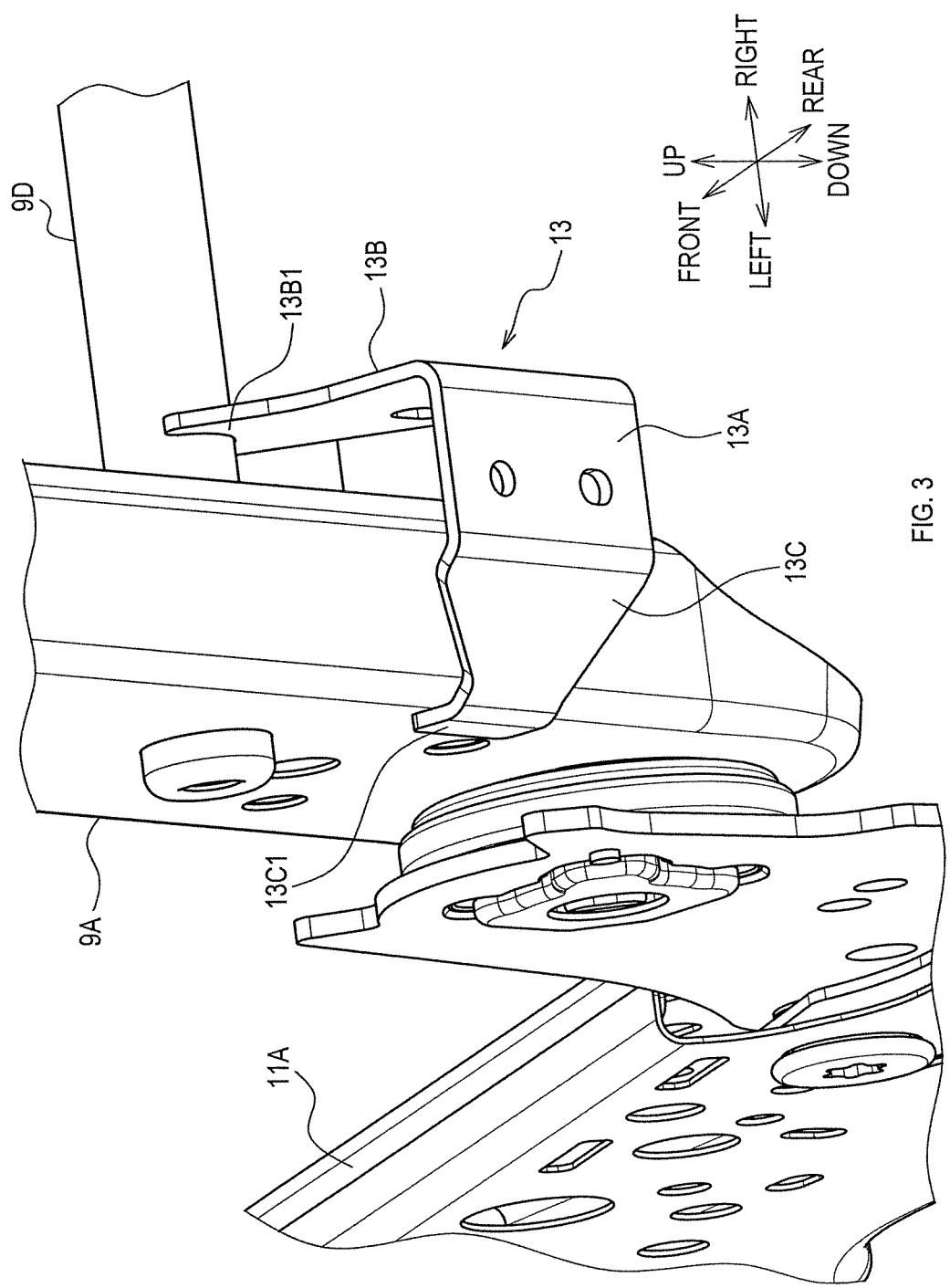
FIG. 3 is a diagram showing a first load absorber of the vehicle seat according to the first embodiment.

The first load absorber 13 is provided to the back frame 9. Specifically, as shown in FIG. 3, the first load absorber 13 is fixed to the first back side-frame 9A and to the second back coupler 9D. Such fixation may be achieved by welding or via a bolt. In the present embodiment, the first load absorber 13 is fixed by welding.

The first load absorber 13 comprises a load receiver 13A, a first load transmitter 13B, and a second load transmitter 13C. The load receiver 13A is formed on a plane intersecting (and substantially orthogonal with, in the present embodiment) the seat front-rear direction.

The first load transmitter 13B and the second load transmitter 13C are connected to and fixed to the back of the back frame 9 by welding. The first load transmitter 13B and the second load transmitter 13C each extend from the corresponding connected and fixed portion toward a seat rear side.

The load receiver 13A is provided to extending-direction ends of the first load transmitter 13B and the second load transmitter 13C. The first load transmitter 13B is displaced relative to the second load transmitter 13C in the seat width direction. The first load absorber 13 has a substantially C-shape or a substantially U-shape.

A front end 13B1 of the first load transmitter 13B is butt-welded to the second back coupler 9D. In other words, the first load transmitter 13B is welded to the second back coupler 9D with the front end 13B1 of the first load transmitter 13B in contact with the second back coupler 9D.

A front end 13C1 of the second load transmitter 13C is welded to the first back side-frame 9A so as to form a lap joint. In other words, fillet welding is performed with a plate surface of the first back side-frame 9A and (a plate surface of) the front end 13C1 of the second load transmitter 13C overlapping each other. Alternatively, a fastener may be used, or contact welding, or adhesive.

The first load absorber 13 is a one-piece article obtained by performing plastic working, such as press working, on a single metal plate to thereby integrally form the load receiver 13A, the first load transmitter 13B, and the second load transmitter 13C.

Figure 4:
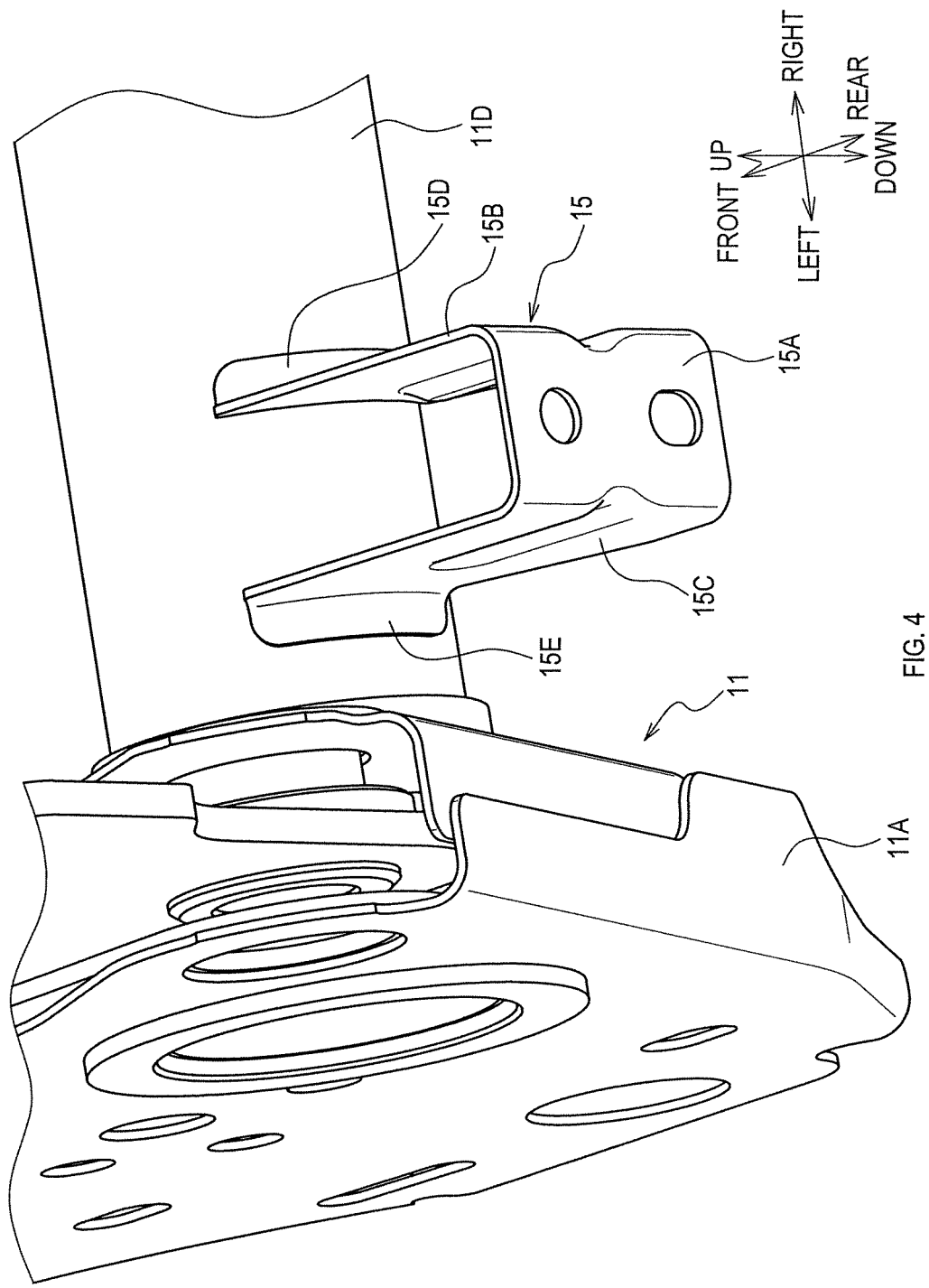
FIG. 4 is a diagram showing a second load absorber of the vehicle seat according to the first embodiment.

<Second Load Absorber, First Embodiment, FIG. 4>

As shown in FIG. 4, the second load absorber 15 is provided to the cushion frame 11. The second load absorber 15 is fixed to the second cushion coupler 11D. Such fixation may be achieved by welding or via a bolt. In the present embodiment, the second load absorber 15 is fixed by welding.

The second load absorber 15 comprises a load receiver 15A, a first load transmitter 15B, and a second load transmitter 15C. The load receiver 15A is formed on a plane intersecting (and substantially orthogonal with, in the present embodiment) the seat front-rear direction.

The first load transmitter 15B and the second load transmitter 15C are connected to and fixed to the back of the cushion frame 11 (to the back of the second cushion coupler 11D, in the present embodiment) by welding. The first load transmitter 15B and the second load transmitter 15C each extend from the second cushion coupler 11D toward the seat rear side.

The load receiver 15A is provided to extending-direction ends of the first load transmitter 15B and the second load transmitter 15C. The first load transmitter 15B is displaced relative to the second load transmitter 15C in the seat width direction. The second load absorber 15 has a substantially C-shape or a substantially U-shape.

Flanges 15D and 15E are respectively provided to a first end of the first load transmitter 15B and a first end of the second load transmitter 15C. The flanges 15D and 15E are provided to increase an area where the second load absorber 15 and the second cushion coupler 11D are in contact with each other, and to facilitate welding.

The first load transmitter 15B and the second load transmitter 15C are each welded to the second cushion coupler 11D with the flanges 15D and 15E in contact with the second cushion coupler 11D.

The second load absorber 15 is a one-piece article obtained by performing plastic working, such as press working, on a single metal plate to thereby integrally form the load receiver 15A, the first load transmitter 15B, and the second load transmitter 15C.

3. Features of Vehicle Seat according to the Present Embodiment

Figure 5:
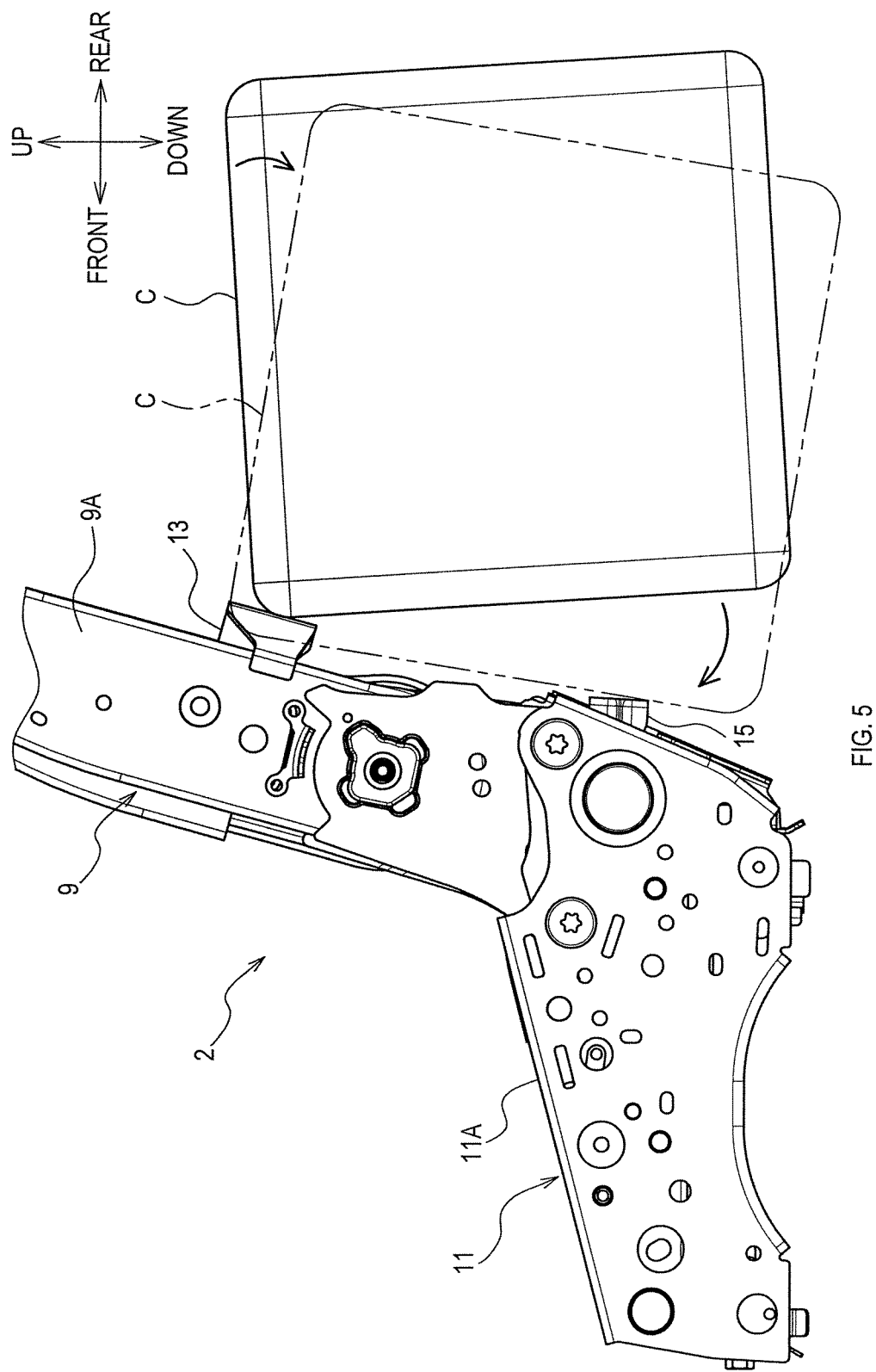
FIG. 5 is a diagram for explaining a feature of the vehicle seat according to the first embodiment.

For example, as shown in FIG. 5, in the event of a collision mode in which "an upper end of a cargo C shown by solid lines collides against the first load absorber 13 and then the cargo C rotates as shown by a two-dot chain line, thus causing a portion of the cargo C lower than the upper end to collide against a back surface of the vehicle seat 1", an impact is absorbed as below in the vehicle seat 1 of the present embodiment.

Specifically, in the vehicle seat 1 of the present embodiment, for example, even when the upper end of the cargo C collides against the first load absorber 13 to plastically deform the first load absorber 13 and then the cargo C rotates, an impact load can be absorbed at the second load absorber 15. Thus, even in the event of the above-described collision mode, the vehicle seat 1 of the present embodiment can absorb the impact.

The first load absorber 13 is provided to the back frame 9, and the second load absorber 15 is provided to the cushion frame 11. This may make it possible to absorb the impact even when the load is input to the vehicle seat 1 in the above-described collision mode.

The second load absorber 15 is configured to transmit at least part of the load input to the second load absorber 15 to the second cushion coupler 11D.

Thus, part of the load input to the second load absorber 15 is transmitted dispersedly to the first cushion side-frame 11A and to the second cushion side-frame 11B via the second cushion coupler 11D. This inhibits the load from concentrating in a part of the cushion frame 11, thus inhibiting severe damage to the cushion frame 11.

The second load absorber 15 comprises the load receiver 15A formed on a plane intersecting the seat front-rear direction, and the first load transmitter 15B and the second load transmitter 15C connected to the back of the second cushion coupler 11D and extending toward the seat rear side.

The load receiver 15A is provided to extending-direction ends of the first load transmitter 15B and the second load transmitter 15C. This makes it possible to reliably transmit at least part of the load input to the second load absorber 15 to the second cushion coupler 11D.

Figure 6:
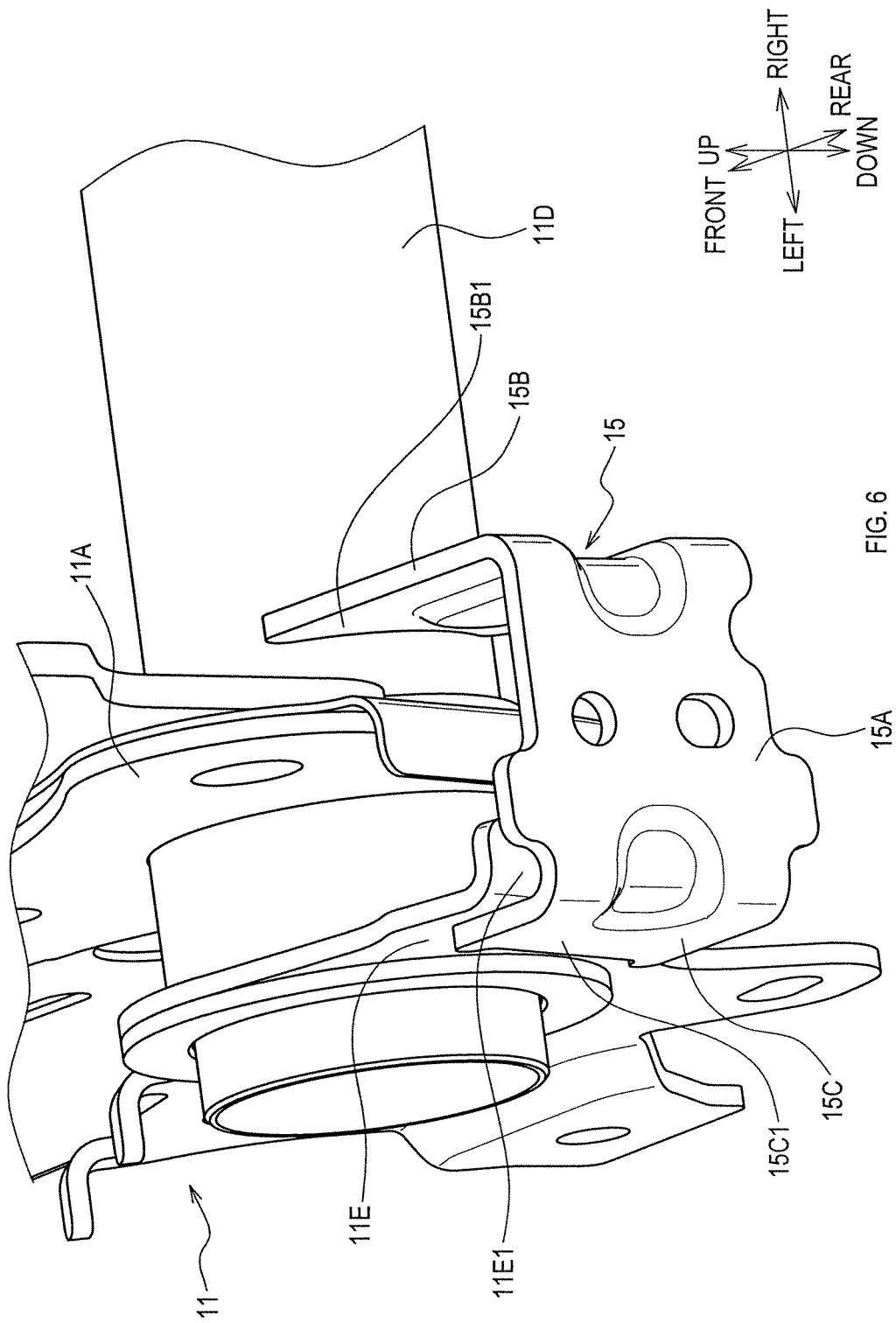
FIG. 6 is a diagram showing a second load absorber of a vehicle seat according to a second embodiment.

Second Embodiment, FIG. 6

In the second load absorber 15 of the above-described first embodiment, the first load transmitter 15B and the second load transmitter 15C are both arranged on the side where the second cushion side-frame 11B is present, relative to the first cushion side-frame 11A.

In contrast, as shown in FIG. 6, in the second load absorber 15 of the present second embodiment, the first load transmitter 15B and the second load transmitter 15C are arranged such that the first cushion side-frame 11A is positioned therebetween. Similarly, the first absorber 13 may be arranged (not shown) such that the first back side-frame 9A is positioned between the first load transmitter 13B and the second load transmitter 13C.

The explanations below relate to differences from the second load absorber 15 of the above-described first embodiment. The same elements and so on as those in the above-described first embodiment are assigned with the same reference numerals as those in the above-described first embodiment. Thus, in the present second embodiment, repetitive explanations are omitted.

The flanges 15D and 15E are not provided to the first load transmitter 15B and the second load transmitter 15C, respectively. A front end 15B1 of the first load transmitter 15B is butt-welded to the second cushion coupler 11D.

A front end 15C1 of the second load transmitter 15C is welded to a bracket 11E provided to the second cushion coupler 11D so as to form a lap joint. The bracket 11E is a planar member fixed to the second cushion coupler 11D, and may include a bracket flange 11E1 configured to support the load receiver 15A.

The bracket 11E is arranged on a side opposite the second cushion side-frame 11B with the first cushion side-frame 11A therebetween. Thus, the first cushion side-frame 11A is positioned between the first load transmitter 15B and the second load transmitter 15C.

The second load absorber 15 of the present second embodiment is a one-piece article obtained by performing plastic working, such as press working, on a single metal plate to thereby integrally form the load receiver 15A, the first load transmitter 15B, and the second load transmitter 15C. The thickness of the metal plate may be greater than that of the plate material forming the second load absorber 15 of the first embodiment.

Other Embodiments

The second load absorber 15 of the above-described embodiments comprises the first load transmitter 15B and the second load transmitter 15C. However, the present disclosure is not limited to this. For example, a configuration may be adopted in which either the first load transmitter 15B or the second load transmitter 15C is not employed.

The second load absorber 15 of the above-described embodiments is a one-piece article obtained by performing plastic working, such as press working, on a single metal plate to thereby integrally form the load receiver 15A, the first load transmitter 15B, and the second load transmitter 15C. However, the present disclosure is not limited to this.

The second load absorber 15 of the above-described embodiments is provided to the second cushion coupler 11D. However, the present disclosure is not limited to this.

For example, the second load absorber 15 may be provided to the first cushion side-frame 11A.

The second load absorber 15 of the above-described second embodiment is provided to the cushion frame 11. However, the present disclosure is not limited to this. For example, the second load absorber 15 may be provided to the back frame 9.

In the above-described embodiments, the first load absorber 13 and the second load absorber 15 are provided only on one end side of the seat frame 7 in the seat width direction. However, the present disclosure is not limited to this. For example, the first load absorber 13 and the second load absorber 15 may be provided on both end sides of the seat frame 7 in the seat width directions.

The first load absorber 13 and the second load absorber 15 of the above-described embodiments are each configured to be plastically deformed, upon application thereto of a load greater than a specified magnitude, to thereby absorb the load. However, the present disclosure is not limited to this.

For example, the first load absorber 13 and/or the second load absorber 15 may be configured to be elastically deformed or destructively deformed, upon application thereto of the load, to thereby absorb the load.

The first load absorber 13 and the second load absorber 15 of the above-described embodiments are made of metal. However, the present disclosure is not limited to this. For example, the first load absorber 13 and/or the second load absorber 15 may be made of resin.

In the above-described embodiments, the explanations have been given of an example of the vehicle seat for an automobile. However, the present disclosure is not limited to this, and can also be applied to seats used in other vehicles, such as railroad vehicles, ships, and aircrafts, and to stationary seats used at theaters, homes, and other places.

Furthermore, the present disclosure is not limited to the above-described embodiments as long as the gist of the invention recited in the appended claims is maintained. Thus, a configuration may be adopted in which at least two of the above-described embodiments are combined together, or in which any of the elements shown in the drawings or explained with the reference numerals in the above-described embodiments is not employed.

What is claimed is:

1. A vehicle seat mounted in a vehicle, the vehicle seat comprising:
   a seat body;
   a seat frame forming a framework of the seat body;
   a first load absorber provided to a back of the seat frame; and
   a second load absorber provided lower than the first load absorber on the back of the seat frame,
   wherein the first load absorber does not contact the second load absorber,
   wherein the seat body comprises:
      a seatback; and
      a seat cushion,
   wherein the seat frame comprises:
      a back frame forming a framework of the seatback; and
      a cushion frame forming a framework of the seat cushion, and
   wherein the first load absorber is provided to the back frame, and the second load absorber is provided to the cushion frame and does not contact the back frame,
   wherein the cushion frame comprises:
      a first side frame and a second side frame each extending in a seat front-rear direction; and
      a coupler coupling a rear end of the first side frame and a rear end of the second side frame to each other, the coupler extending in a seat width direction, and
   wherein the second load absorber is configured to transmit at least part of a load input to the second load absorber to the coupler.

2. The vehicle seat according to claim 1,
   wherein the second load absorber comprises:
      a load receiver formed on a plane intersecting the seat front-rear direction; and
      a load transmitter connected to a back of the coupler and extending rearward from the coupler, the load transmitter being provided with, at an extending-direction end thereof, the load receiver.

3. The vehicle seat according to claim 1, further comprising a bracket fixed to the coupler,
   wherein the second load absorber includes:
      a load receiver extending in a plane intersecting the seat front-rear direction;
      a first load transmitter extending forward from the load receiver and including a front end connected to the coupler; and
      a second load transmitter extending forward from the load receiver and including a front end connected to the bracket.

4. The vehicle seat according to claim 3, wherein
   the bracket is positioned on an opposite side of the first side frame from the second side frame, and
   the first side frame is positioned between the first load transmitter and the second load transmitter.

5. The vehicle seat according to claim 3,
   wherein the bracket includes:
      a planar portion fixed to the coupler and extending in the seat front-rear direction; and
      a bracket flange that extends from a rear end of the planar portion in a plane intersecting the seat front-rear direction, and supports the load receiver,
   wherein the front end of the second load transmitter is connected to the planar portion of the bracket.

6. The vehicle seat according to claim 3, wherein the bracket includes an opening, and the coupler passes through the opening to be fixed to the bracket.

7. The vehicle seat according to claim 1, wherein the second load absorber includes:
   a load receiver extending in a plane intersecting the seat front-rear direction;
   a first load transmitter and a second load transmitter, each extending forward from the load receiver, the first load transmitter and the second load transmitter being spaced from each other in the seat width direction;
   a first flange extending from a front end of the first load transmitter in a direction away from the second load transmitter, and
   a second flange extending from a front end of the second load transmitter in a direction away from the first load transmitter,
   wherein the first flange and the second flange are welded to the coupler.

8. A load absorbing member for use in a vehicle seat, the vehicle seat comprising:
   a seat body; and
   a seat frame forming a framework of the seat body, and the load absorbing member being configured to be provided to a back of the seat frame, and absorbing a load by being deformed when the load is input to the load absorbing member, wherein the seat body includes a seatback and a seat cushion, wherein the seat frame includes a back frame forming a framework of the seatback and a cushion frame forming a framework of the seat cushion, and wherein the load absorbing member is provided to the cushion frame and does not contact the back frame, wherein the cushion frame comprises:
 a first side frame and a second side frame each extending in a seat front-rear direction; and
 a coupler coupling a rear end of the first side frame and a rear end of the second side frame to each other, the coupler extending in a seat width direction, and wherein the load absorbing member is configured to transmit at least part of the load input to the load absorbing member to the coupler.

9. The load absorbing member according to claim 8, comprising:
 a load receiver formed on a plane intersecting the seat front-rear direction; and
 a load transmitter connected to a back of the coupler and extending rearward from the coupler, the load transmitter being provided with, at an extending-direction end thereof, the load receiver.

10. The load absorbing member according to claim 8, wherein the load absorbing member includes:
 a bracket fixed to the coupler,
 a load receiver extending in a plane intersecting the seat front-rear direction;
 a first load transmitter extending forward from the load receiver and including a front end connected to the coupler; and
 a second load transmitter extending forward from the load receiver and including a front end connected to the bracket and a rear end connected to the load receiver.

11. The load absorbing member according to claim 10, wherein
 the bracket is fixed to the coupler on an opposite side of the first side frame from the second side frame, and
 the first side frame is positioned between the first load transmitter and the second load transmitter.

12. The load absorbing member according to claim 10, wherein the bracket includes:
 a planar portion fixed to the coupler and extending in the seat front-rear direction; and
 a bracket flange that extends from a rear end of the planar portion in a plane intersecting the seat front-rear direction, and supports the load receiver,
wherein the front end of the second load transmitter is connected to the planar portion of the bracket.

13. The load absorbing member according to claim 8, wherein the load absorbing member includes:
 a load receiver extending in a plane intersecting the seat front-rear direction;
 a first load transmitter and a second load transmitter, each extending forward from the load receiver, the first load transmitter and the second load transmitter being spaced from each other in the seat width direction;
 a first flange extending from a front end of the first load transmitter in a direction away from the second load transmitter, and
 a second flange extending from a front end of the second load transmitter in a direction away from the first load transmitter,
wherein the first flange and the second flange are configured to be welded to the coupler.

14. A vehicle seat according to claim 1, wherein mounted in a vehicle, the vehicle seat comprising:
 a seat body;
 a seat frame forming a framework of the seat body;
 a first load absorber provided to a back of the seat frame; and
 a second load absorber provided lower than the first load absorber on the back of the seat frame,
wherein the first load absorber does not contact the second load absorber,
wherein the seat body includes a seatback;
wherein the seat frame includes a back frame forming a framework of the seatback,
wherein the back frame includes:
 a first back side-frame and a second back side-frame spaced from each other in a seat width direction; and
 a back coupler coupling the first back side-frame and the second back side-frame, the back coupler extending in the seat width direction,
wherein the first load absorber includes:
 a load receiver extending in a plane intersecting a seat front-rear direction;
 a first load transmitter extending forward from the load receiver and including a front end connected to the back coupler; and
 a second load transmitter extending forward from the load receiver and including a front end connected to the first back side-frame.

15. The vehicle seat according to claim 14, wherein the first load absorber is positioned such that the first back side-frame is positioned between the first load transmitter and the second load transmitter in the seat width direction.

* * * * *